United States Patent
Hoskinson et al.

(10) Patent No.: US 6,591,145 B1
(45) Date of Patent: Jul. 8, 2003

(54) SYSTEMS AND METHODS FOR AUTONOMOUSLY CONTROLLING AGRICULTURAL MACHINERY

(75) Inventors: Reed L. Hoskinson, Rigby, ID (US); Dennis N. Bingham, Idaho Falls, ID (US); John M. Svoboda, Idaho Falls, ID (US); J. Richard Hess, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 362 days.

(21) Appl. No.: 09/666,244

(22) Filed: Sep. 21, 2000

(51) Int. Cl.$^7$ .............................................. G05B 13/02
(52) U.S. Cl. .............................. 700/28; 700/31; 700/48; 700/47; 701/50; 460/1; 460/4; 460/5; 460/6; 460/7; 56/10.2 R; 56/10.2 B; 56/10.2 C; 56/10.2 D; 56/10.2 E; 56/10.2 G
(58) Field of Search .............................. 700/28, 31, 48; 700/47; 701/50; 56/10.2 R, 10.2 B, 10.2 C, 10.2 D, 10.2 E, 10.2 G, DIG. 15; 460/1, 4, 5, 6, 7

(56) References Cited

U.S. PATENT DOCUMENTS

| | | | | |
|---|---|---|---|---|
| 4,337,611 A | * | 7/1982 | Mailander et al. ............. 460/7 |
| 5,535,577 A | * | 7/1996 | Chmielewski et al. ... 56/10.2 E |
| 5,586,033 A | * | 12/1996 | Hall ............................. 701/50 |
| 5,978,720 A | * | 11/1999 | Hieronymus et al. ......... 701/29 |
| 6,012,272 A | * | 1/2000 | Dillon .......................... 56/14.6 |
| 6,119,442 A | * | 9/2000 | Hale ........................ 56/10.2 H |

* cited by examiner

Primary Examiner—John Follansbee
Assistant Examiner—Thomas Pham
(74) Attorney, Agent, or Firm—Workman Nydegger & Seeley

(57) ABSTRACT

Systems and methods for autonomously controlling agricultural machinery such as a grain combine. The operation components of a combine that function to harvest the grain have characteristics that are measured by sensors. For example, the combine speed, the fan speed, and the like can be measured. An important sensor is the grain loss sensor, which may be used to quantify the amount of grain expelled out of the combine. The grain loss sensor utilizes the fluorescence properties of the grain kernels and the plant residue to identify when the expelled plant material contains grain kernels. The sensor data, in combination with historical and current data stored in a database, is used to identify optimum operating conditions that will result in increased crop yield. After the optimum operating conditions are identified, an on-board computer can generate control signals that will adjust the operation of the components identified in the optimum operating conditions. The changes result in less grain loss and improved grain yield. Also, because new data is continually generated by the sensor, the system has the ability to continually learn such that the efficiency of the agricultural machinery is continually improved.

30 Claims, 3 Drawing Sheets

SYSTEMS AND METHODS FOR AUTONOMOUSLY CONTROLLING AGRICULTURAL MACHINERY

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates to systems and methods for autonomously controlling machinery. More particularly, the present invention relates to systems and methods for use with machinery used in precision agriculture. More specifically, the present invention relates to systems and methods for autonomously controlling harvesting machinery such as a combine.

2. Present State of the Art

A major goal of precision agriculture is to ultimately increase the product yield by more closely monitoring and controlling many of the factors that influence agricultural output. The effectiveness of precision agriculture is often measured in terms of crop yield and there are many factors that may have a significant effect on the crop yield. Some of those factors include the amount of water received by the growing crop, the amount and type of fertilizer provided to the crop, the amount and type of herbicides and pesticides applied to the crop, the type of machinery used to harvest the crop, and the like. As a result, there are many different factors or combination of factors related to agriculture that can be altered or changed to have a positive effect on the crop yield.

Machinery in particular, such as a grain combine, can have a significant impact on the crop yield. As the grain combine proceeds through a grain field, the grain plants are cut and fed into a threshing unit. The threshing unit rubs the cut plants between a rotor and a concave in order to separate the grain from the remainder of the plant. During the threshing process, the grains that are separated from the plant fall into a grain pan and the remaining plant residue is directed to the rear of the grain combine for discharge. Next, the separated grain is cleaned by passing it over a cleaning sieve. Air blowing up through or across the cleaning sieve separates much of the remaining plant material while the grain is allowed to fall through the sieve. At this point, the grain is moved to the grain storage bin and the chaff separated in the cleaning sieve is expelled out the back of the grain combine.

A grain combine has many different components and systems that interact with the crop being harvested and as a result, each separate component or system of the grain combine may have an effect on the amount of grain that is actually harvested. In addition, other factors, such as the forward speed of the grain combine, temperature, humidity, crop moisture, crop biomass, and the like may also play a role in the ability of the grain combine to minimize the amount of grain that is lost.

With regard to precision agriculture, the essential purpose of the grain combine is to harvest as much grain as possible, which helps to maximize the crop yield. In order to perform this function, it is often necessary to know how much grain is being lost from the combine. Quantifying or monitoring the amount of grain being lost during the harvesting process is an important factor that is used to optimize the operation of the grain combine. One solution to this problem is the use of a piezoelectric sensor that is typically located at the rear of the grain combine mounted at the back end of the cleaning sieves.

When grain kernels impact this type of sensor, a small measurable voltage is generated. This type of sensor, however, may not be able to distinguish between larger pieces of straw and pieces of grain that impact the sensor. Also, current piezoelectric sensors are unable to detect grain that is blown out the back end of the combine with the plant residue and are not able to sense the grain that is within the mat of straw moving across the cleaning sieve because those kernels do not come into contact with the sensor. Further, a piezoelectric sensor typically provides signal to a display panel that instructs the grain combine operator to either go faster or slower when the grain loss is unacceptable. Thus, the only adjustment the operator can make is related to the forward velocity of the combine, which may or may not be the problem. Often, an adjustment to the velocity of the combine is an inadequate solution and does not improve the amount of grain being lost. More simply, a piezoelectric sensor mounted in this manner is very difficult to calibrate and does not provide significant value to a precision farmer.

What is needed are systems and methods for autonomously controlling agricultural machinery. Systems and methods are needed that provide the ability to adjust, as well as monitor, the systems and devices that operate within agricultural machinery such that the crop yield or other quality measurement or collection of quality measurements are optimized.

SUMMARY OF THE INVENTION

Agricultural machinery plays an important role in precision agriculture. Properly maintained equipment is needed to ensure that the amount of crop being harvested is maximized. However, agricultural machinery typically have many different components and systems that perform various functions, and an operator of agricultural machinery is often unable to effectively monitor those components and systems. The present invention relates to systems and methods that monitor agricultural machinery and make real time adjustments to the agricultural machinery such that the operation of the machinery is optimized. The optimization can be related to the crop yield or other quality standards or group of standards. The optimization of the agricultural machinery is performed by is analyzing data that may be provided from one of several sources. A preferred source of data is from sensors that are connected with the agricultural machinery in such a way as to provide information about the various systems and components operating within the machinery. In the case of a grain combine, for example, sensors are used to determine component characteristics or measurements such as the fan speed, the grain loss, the rotor speed, and the like. An analysis of the information provided by the sensors is used to determine what adjustments should be made to the grain combine. Exemplary adjustments include altering the fan speed, altering the combine velocity, changing the chaff opening, and the like.

An important sensor used in optimizing the operation of, for example, a grain combine, is a grain loss sensor. A preferred embodiment of a grain loss sensor relies on the flourescent properties of various grains. An analysis of the emissions of the plant material expelled from the rear of the combine may therefore be used to quantify the amount of grain being lost.

Other sources of information are the historic and current facts which include information related to both the agricultural machinery and the agricultural fields, geography, climate, pesticides, herbicides, crop data, and the like. This information is used, often in combination with the sensor data, to alter the operations or characteristics of the agricultural machinery such that the harvest yield is optimized.

While the systems and methods provided by the present invention provide for autonomous control of agricultural machinery, manual commands, which override the autonomous control system, may also be used to control the agricultural machinery. In this manner, a machinery operator has full control over the machinery.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
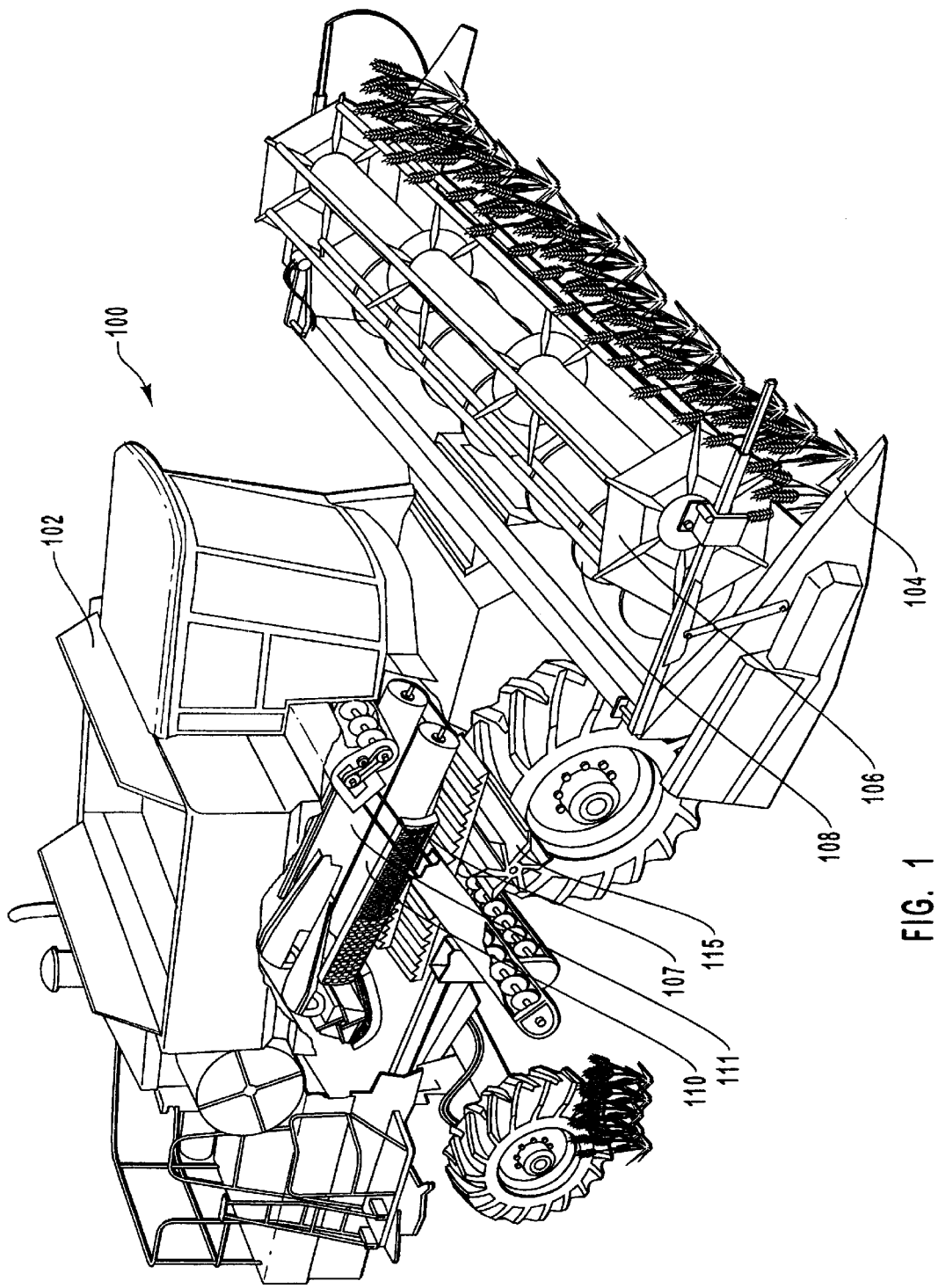
FIG. 1 is a perspective view of both a grain combine and the internal components and systems of the grain combine.

Precision agriculture is intended to improve a variety of site-specific or crop-specific technologies. Control systems and methods are provided that automatically operate machinery to optimize an identified variable or a group of identified variables. With regard to agricultural machinery, the identified variable is often the crop yield. For a grain combine, the identified variable is often the crop yield, but it is referenced in terms of grain collected or harvested. A grain combine maximizes or optimizes the crop yield by minimizing the amount of grain lost in the harvesting process.

The control systems and methods utilize on-board sensors to measure operating conditions in real-time. In addition to the real-time measurements provided by the sensors, other information including data related to the crop being harvested. This information is analyzed to determine what the optimum operating conditions are for the present conditions. After the optimum operating conditions are identified, control signals are generated that adjust the current operating conditions to substantially match the identified optimum operating conditions. The optimum conditions are identified utilizing statistical relationships among the data as well as rule-based or case-specific technologies.

The present invention extends to both systems and methods for autonomously controlling machinery including agricultural machinery such as grain combines. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

As used herein, the term "database" refers to a computer-readable medium. Database also refers to data structures that are used to store information or data. The database can be resident in multiple locations and each location can be used to store different portions of the data being collected. In the context of the present invention, the database may be located on farm equipment such as a combine as well as in a central location such as a home or other building. The term database can refer to the database in all locations collectively or to a single portion of the database that may be resident, for example, on the farm-equipment or in the stationary location.

Figure 2:
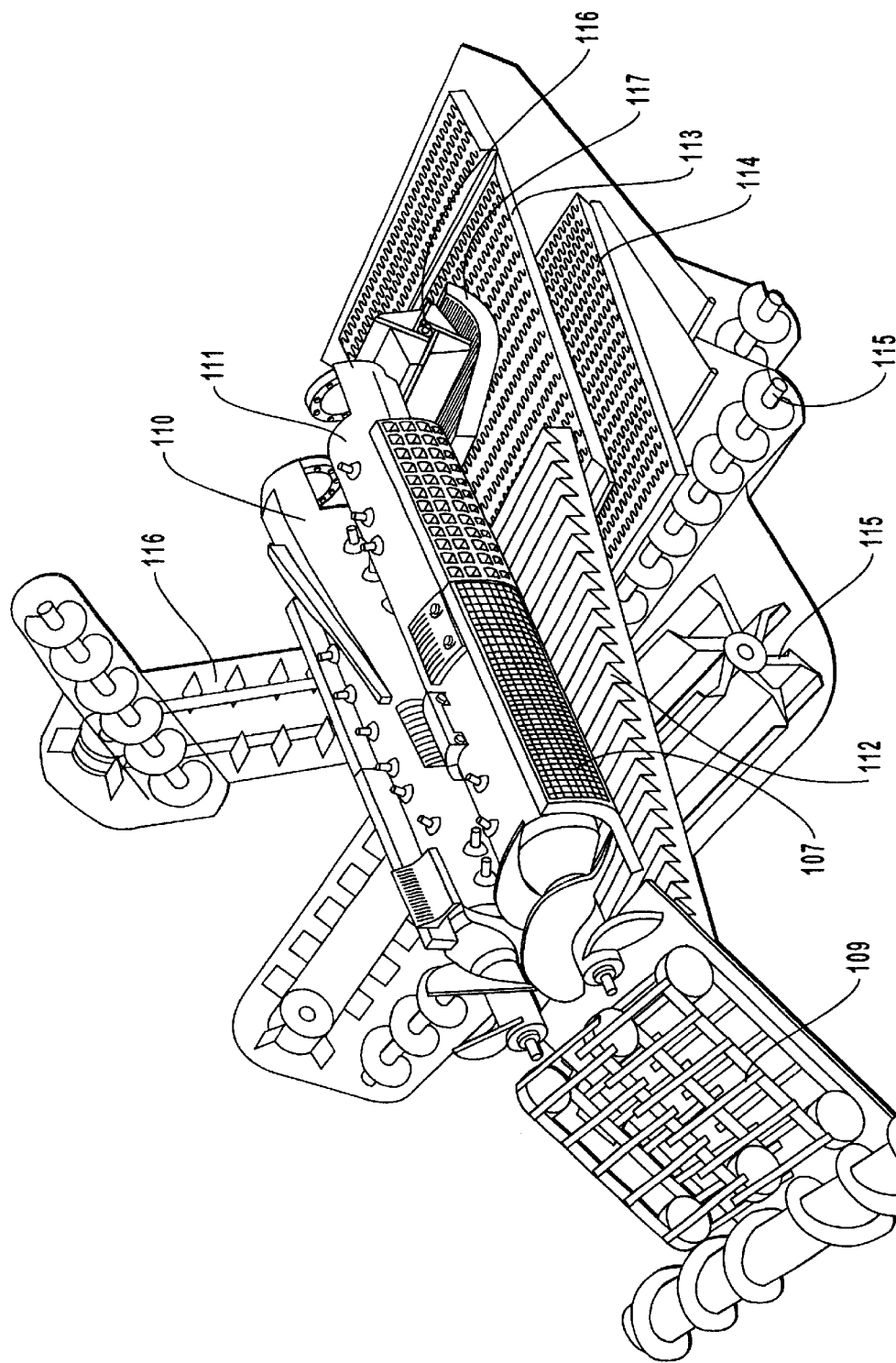
FIG. 2 is a perspective view of components and systems of a grain combine that perform harvesting related functions including threshing, separating, and cleaning the grain.

As used herein, the term "historic statement" refers to data collected by sensors that is temporally related to the crop or the field. The term "current statement" refers to data that is temporally related to the current crop or field. More generally, a current statement is created from the information that is currently collected by the sensors while a historic statement was created from information that was collected by the sensors in the past. The current statements eventually become historic statements. Both current statements and historic statements contain the same type of information and the primary difference between current statements and historic statements is related to when the statements were collected. FIG. 1 is a perspective view of a grain combine 100 and FIG. 2 illustrates the operation of the internal components and systems of the grain combine 100 illustrated in FIG. 1. The following discussion is in reference to both FIG. 1 and FIG. 2. The essential purpose of the grain combine 100 is to harvest grain. While the systems and methods of the present invention are discussed with reference to the grain combine, the systems and methods of the present invention may also be applied to other types of machinery, including wood chipping devices, milling machinery, machinery used to harvest other grains such as corn and soybeans, potato harvesters, stationary machinery, mobile machinery and the like. Grain, as used herein, refers to the crop being harvested and may include, but is not limited to, oats, barley, wheat, soybeans, corn, peas and the like. Depending on the context, grain may refer to the entire plant or may refer solely to the kernels, seeds, or fruit of a plant. The methods and systems of the present invention are further described in terms or grain harvesting, but may also be applied more generally to agricultural systems including machinery used for planting, fertilizing, applying pesticides, irrigation, and the like.

Generally, the operation of the grain combine 100 is to receive a grain plant into the grain combine where the grain is separated from the rest of the plant. The grain combine 100 effectively implements four basic systems that allow the grain to be harvested: a feeding system; a threshing system, a separation system; and a cleaning system. These systems allow the grain to be collected in the grain storage bin 102, while the rest of the plant, or the residue is typically discarded.

The feeding system is the first system encountered by the grain plant. As the combine 100 proceeds through the grain field, the grain plant is usually cut by a mower 104, but may also be collected from a previously prepared windrow. After the grain plant is cut, a header rake 106, a header auger 108, and an elevator 109 direct the grain plant into the threshing system of the grain combine 100. The feeding system organizes the cut grain plant such that it is provided to the threshing system in a relatively controlled manner.

The threshing system essentially includes at least one rotor positioned within a concave such that the grain plant passes between the rotor and the concave. FIG. 2 illustrates a threshing system having two rotors identified as rotor 110 and rotor 111. The threshing system further includes a concave 107, which is a curved screen having multiple openings. The concave 107 is positioned close to the rotors 110 and 111. As the feeding system causes the grain plant to pass between the rotors 110, 111 and the concave 107, the concave 107 exerts a force against the grain plant to push the grain plant against the rotors 110 and 111 such that the grain is separated from the rest of the grain plant as the rotors 110 and 111 rotate about their axes. The resulting rubbing action of the grain plant between the rotors and the concave effectively separate the grain from the rest of the plant. More simply, the rotation of the rotors 110 and 111, in combination with the concave 107, introduces a threshing action directed at the grain plant. The openings in the concave 107 allow the separated grain to fall through the concave 107 into the grain pan 112.

While the grain plant is passing through the threshing system, the grain takes one path while most of chaff or residue takes another. The grain, which falls through the openings of the concave 107 into a grain pan 112, proceeds from the grain pan 112 to a cleaning system that has a chaffer sieve 113 and a cleaning sieve 114. Both the chaffer sieve 110 and the cleaning sieve 111 have perforations or openings that allow the grain to fall through to an auger 112 and elevator 116 arrangement, which causes the separated and cleaned grain to be transported to the grain tank 102.

Both the chaffer sieve 113 and the cleaning sieve 114 are shaken vigorously to further separate the grain from excess chaff and other plant residue that was not previously separated from the grain. A variable speed fan 115 is also employed in the process of cleaning and separating the grain from the chaff or residue. The fan 115 causes air to blow across the sieves to blow with sufficient force to remove the chaff and other residue while allowing the grain to fall through the openings in the sieves. The speed of the fan 115 can have a significant effect on grain loss as well as the quality of overall crop yield because if the fan 115 produces too much air, then excessive grain will be lost and if the fan 115 is not producing enough air flow, then the grain will not be properly cleaned. Also, if the fan 115 is not blowing enough air, the sieves may become plugged, which will ultimately result in lost time and additional grain loss. By producing or generating a desirable air flow across the cleaning sieves, a clean grain product may be achieved and grain loss may be minimized. The excess chaff which is separated from the grain by the fan 115 is typically expelled through the rear of the grain combine.

The residue of the grain plant that does not fall through the concave 107 passes through a rear beater 116 and grate 117 to extract or thresh any remaining grain from the residue. Grain separated in this manner falls through openings in the grate 115 into the cleaning system and is further cleaned and separated as described above. The remaining residue passes through the rear beater 116 and grate 117 and is expelled out the back of the combine 100. Any grain expelled out of the back of the combine 100 is not typically recoverable and constitutes a portion of the grain loss.

As illustrated in FIGS. 1 and 2, there are many different components and systems that can have an effect on the grain loss of the combine. For instance, if the fan 115 is blowing too much air, then grain in addition to excess chaff, will be expelled from the back of the combine. Grain loss is also increased if the combine is moving through a grain field with too much forward velocity, because the feeding system may take too much plant material into the combine, which may cause the threshing system to plug. Alternatively, if too much of the grain plant is being fed into the combine, then the threshing system 100 may not be able to completely and efficiently thresh the grain plant, which also results in excessive grain loss. If the concave 107 is pushing up against the rotors 110 and 111 with excessive force, then the grain may be crushed or otherwise damaged or lost. In sum, there are many mechanisms that can contribute to excessive grain loss as well as sub-optimum functioning of the combine.

In addition to the operation of the components and systems of the combine, there are many other factors that can have an effect on the amount of crop collected. Present and past grain harvest data, including grain yield mass, protein, broken kernels, foreign materials, and percent moisture of the harvested grain can also be used to increase harvesting efficiencies. For example, if the sensors operating with the combine sense that especially dry grain is being harvested, this information or current statement may be used to adjust the operation of the combine automatically. While described in more detail below, a current statement is used in conjunction with facts generated from historic statements to determine what adjustments should be made to the operating conditions of the combine such that the efficiency of the combine is improved.

Figure 3:
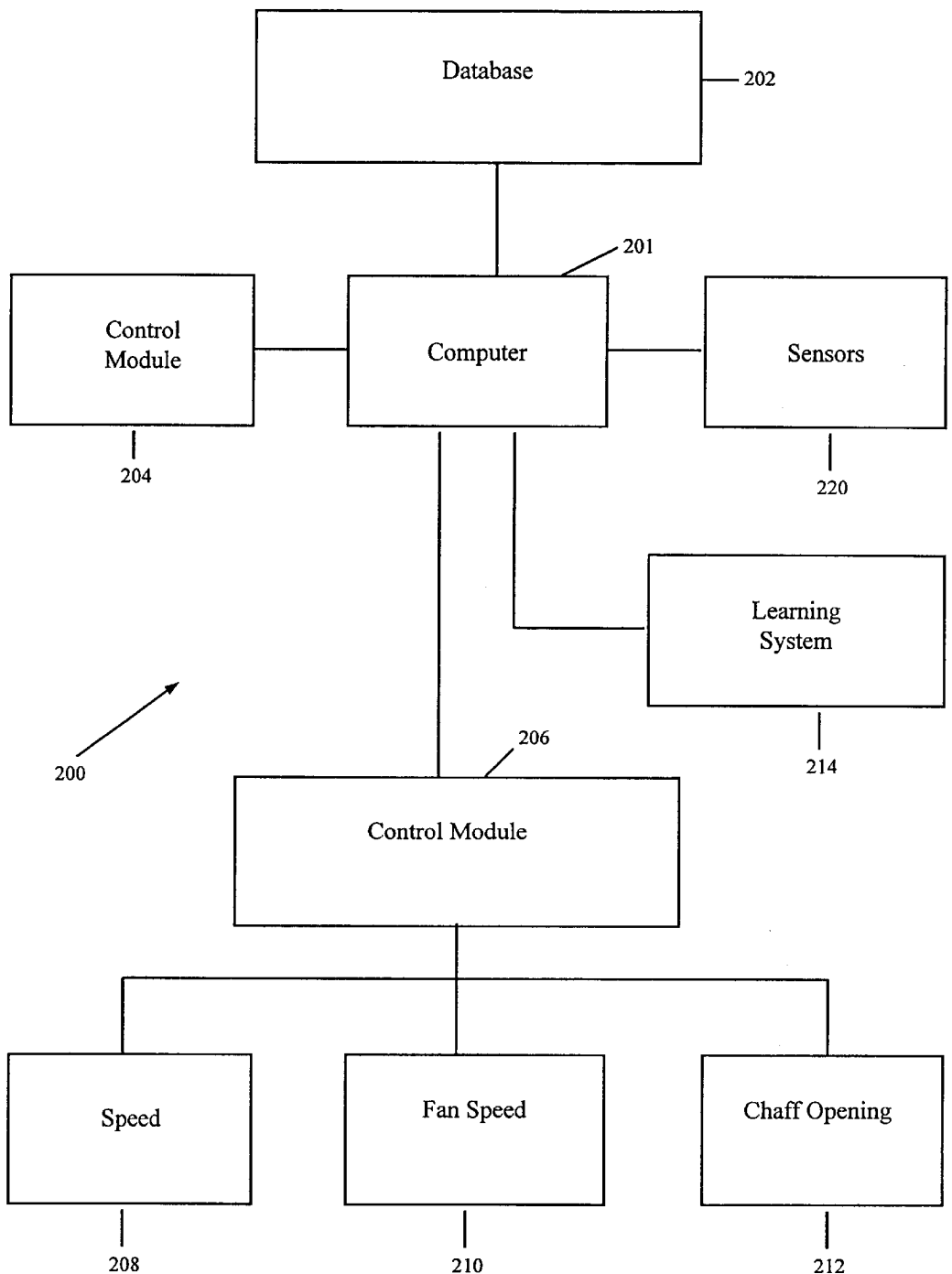
FIG. 3 is a block diagram illustrating one preferred embodiment of a control system for autonomously controlling a grain combine.

Because there are many different factors that may have an impact on the harvesting process, it is almost impossible for a combine operator to be aware of these factors and have the ability to adjust the combine's operation based on an analysis of those factors. FIG. 3 is a block diagram illustrating one embodiment of a system for autonomously controlling the operation of a combine. As previously indicated, these systems and methods are described in reference to a combine, but may be applied to stationary and mobile machinery in different industries.

The system 200 includes several components and modules which function to autonomously control a combine. Not all of the modules described herein are necessary for the system 200 to function efficiently, but each module of the system 200 is present in a preferred embodiment. One goal of the system 200 is to minimize the grain loss as well as the grain damage which may occur during harvesting. The system 200 allows agricultural machinery such as a combine to operate in an optimum manner such that a better crop is harvested as reflected by the crop yield or other quality measurements.

Central to the system 200 is a computer 201, which has access to external input, such as sensor data or manual commands and has access to stored data from a database or other source. The computer 201 may be a special or general purpose computer that is physically present on the combine. Alternatively, the computer 201 may be accessible by the combine over a wireless communication link.

The computer 201 also has access to a database 202, which may be a local or remote database. The database 202 is embodied on a computer readable medium and is used to store information that is primarily relevant to the operation of the combine. The information in the database 202 may alternatively be designed for any type of machinery or equipment. In the case of a combine, the database 202 preferably stores various types of information that are specific to the combine. In one embodiment, the database 202 is divided such that a portion of the database 202 is present on the machinery while another portion of the database 202 is located in a stationary location, such as a building.

The information stored in the database 202 is generally referred to as historic statements and current statements. As previously stated, historic statements refer to information gathered in previous years or harvests while current statements refer to information that is related to the current year or the current harvest. The type of information is the same for both historic and current statements, but the time frame differs. As a result, an analysis of the database 202 may give more weight to more current statements. A preferred example of a historical or a current statement is the information produced by the sensors that sense the operating conditions of the combine or other machinery. Thus, the fan speed, the concave force, the angular velocity of the rotors, the concave position with respect to the rotors, the forward velocity of the combine, the angular velocity of the header auger, the speed of the elevator, the air flow speed, and the like are usually included in both the current statements and the historical statements. Usually, the historical statements are stored in the stationary portion of the database 202 while the current statements are stored in the portion of the database 202 located on the combine or other machinery.

Other examples of historical and current statements that may be stored in the database 202 include, but are not limited to: grains in general and grain harvesting; specific attributes or facts of a particular field; temperature, pesticide information; herbicide information; crop yield data; crop humidity, biomass information; protein content; percent moisture; broken kernels, grain loss information; and the like. More particularly, the data in the database 202 is often a representation of the historical statements associated with one or more particular fields. Thus, the database 202 contains the crop yield for those fields, the amount of water used to irrigate those fields, the type and amount of pesticides and herbicides, and the like. The database 202 may also contain data such as the velocity of the combine when harvesting a particular portion of a particular field. The database 202 may be used to store prodigious amounts of data that may have an impact on the operation of agricultural machinery.

In one embodiment, only the statements that are relevant to the combine are used to assess the operation of the combine. The other current and historical statements discussed herein may be applied to a combine, but may be even more useful when used in conjunction with a decision support system that may make decisions for the farming operation as a whole. With respect to a single combine, the relevant current and historic statements are produced from the sensors that sense the operating conditions of the combine.

The information in the database 202 may be collected over time and may be directed to particular grain fields or to particular portions of those grain fields. In general however, the information in the database 202 is not spatially related to the grain fields, but is related to the conditions that are sensed as the combine is operating. Thus, the database 202 can be used by the computer 201 to evaluate the operation of the combine as a particular portion of the grain field is being harvested. Also, information collected in the current harvest is added to the database 202 and the collected information is also used in the analysis. In a preferred embodiment, the information in the database 202 is mined to extract information that may be used to increase the crop yield and improve the performance of the combine. Frequently, the database 202 is mined to produce a set of facts or to update existing facts.

In a preferred embodiment, the historical statements are mined or analyzed from the stationary portion of the database 202 to generate facts that are provided to and stored on the portion of the database 202 on the combine. As the combine harvests the grain, sensors generate current statements that reflect the operating conditions of the combine. The facts are used to adjust the operating condition of the combine in view of the current statement. For example, a combine often experiences different operating conditions as a grain is harvested. Sometimes, the crop density is higher than in other combinations. When a higher crop density is encountered it is possible that the grain loss will increase. A current statement will indicate that grain loss has increased and may also indicate that the crop density has also increased. With these current statements, the facts are used to adjust the operation of the combine. For example, the facts may dictate that the combine decrease its forward velocity in view of the current statement. Alternatively, the facts may dictate that the fan speed be increased. Another possible action is to both increase the fan speed as well as decrease the forward velocity of the combine. When another current statement is collected, the facts are again consulted to adjust the operating conditions of the combine. In this manner, the combine may be autonomously controlled to maximize the harvest.

The combine operator may be made aware of changes made to the operation of the combine, but it is not necessary to inform the operator of those changes as the adjustments may be made automatically by the system 200. The database 202 may be similarly accessed or mined for other data to assist in precision agricultural operations performed by the combine. Additionally, as a crop is being harvested, the database 202 is updated to include current statements that are incorporated with existing facts. In this manner, the current statements may be considered as the facts are mined, generated, or updated.

The system 200 also has a learning system 214. The learning system 214 is often utilized to mine information from the database 202. The learning system 214 is able to integrate the historical statements with the current statements to assist in determining how the combine may be efficiently operated. The learning system 214 is also capable of recognizing situations that repeatedly occur during the operation of the combine 100 and may also learn which adjustments are necessary to alleviate or optimize those situations.

An important part of the system 200 is the sensors 220. The sensors 220 are primarily utilized to provide information or current statements about the various components and systems operating within the combine as described above. The current statements provided by the sensors 220 may therefore be used to adjust the various components and systems within the combine. The operation of the combine may be optimized by using the information provided by the sensors 220. Thus, the information or facts mined from the database 202 and the learning system 214 may be ignored. In some embodiments, only sensors 220 will be available to access the operating conditions of the combine.

Some of the sensors that may be included in the sensors 220 are described with reference to FIGS. 1 and 2. Often, the sensors included in the sensors 220 measure a physical variable or characteristic of a particular component or system, such as speed, angular velocity, pressure, and the like. Also, some of the sensors included in the sensors 220 measure a variable or characteristic that is not an integral part of the combine because there may be external factors that nonetheless have an effect on the operation of the combine 100. Exemplary sensors include, but are not limited to: a sensor to detect the angular velocity of the rotors 110 and 111; a sensor to detect the force that the concave 107 exerts against the rotors 110 and 111; a sensor to measure the position of the concave 107 with respect to the rotors 110 and 111; a sensor to measure the force of the grate 117 against the beater 116; a sensor to measure the forward velocity of the combine 100; a sensor to determine the rotational speed of the header auger 108; a sensor to measure the speed of the elevator 109; a sensor to measure the volume of grain in the grain tank 102; a sensor to measure the pressure across the chaffing sieve 113 and the cleaning sieve 114 a sensor to measure the force or speed of the air flow generated by the fan 115; a sensor to measure the rotational speed of the fan 115; a sensor to measure the force that is shaking the chaffing sieve 113 and the cleaning sieve 114; a sensor to detect the presence of a plug in the combine 100; a sensor to measure the moister content of the grain; a temperature sensor; a humidity sensor; a yield sensor; and the like.

Another sensor included in the sensors 220 is a grain loss sensor. Previous sensors were mounted to the rear of the cleaning sieve and generated a small voltage each time a grain kernel impacted the sensor. However, the grain expelled out of the back of the combine as well as the grain carried out with the mat of straw moving across the cleaning sieve are not sensed by such sensors.

One of the characteristics of organic material such as grain and grain plants is that they have fluorescence properties. One embodiment of the grain loss sensor utilizes the fluorescence properties of grain plants, such as wheat, oats, barley, corn, soybeans and the like to determine the grain loss. The emission wavelengths of the discarded residue may be monitored as the grain plant residue is discharged from the combine. The grain loss may be determined because the wavelengths emitted by the grain kernels is differentiable from the wavelengths emitted by the chaff, residue and foreign materials. For example, peak wheat emission occurs at an excitation wavelength of approximately 375 nanometers. Another embodiment of a grain loss sensor interprets the Nuclear Magnetic Resonance (NMR) properties of the organic material. For example, an analysis for carbon 13 in wheat and straw produces strong peaks when wheat is present as opposed to when wheat is not present in the straw. In this manner, the grain loss may be quantified and utilized to optimize the operation of the grain combine.

Other sensors may also be incorporated into sensors 220 that are not specifically related to the combine 100 yet have an effect on the operation of the combine 100. For instance, a topography sensor configured to detect the topography and slope of the ground may be mounted to the combine 100 such that the ground is periodically sampled and evaluated to determine the slope or shape of the ground. The sensors 220 can be expanded to detect other variables which may be identified by an operator. An operator may also have the option of being able to select which sensors are to be active. This may allow an operator to focus on specific variables, such as fan speed and forward velocity.

The information produced by the sensors 220, in combination with the information mined or retrieved from the database 202 and the learning system 214, is used to optimize the operation of the combine 100. Once the computer 201 determines an optimum configuration for the combine 100, the control module 206 is used to generate. control signals, which may be used to control the operation of the combine 100. This may include adjusting the operation of one or more combine components.

For example, if it is determined that the optimum configuration requires adjustments to the velocity of the combine, the fan speed, and the chaff opening, then the control module 206 generates control signals that alter the speed 208, the fan speed 210 and the chaff opening 212. Typically, adjustments are made slowly, as opposed to rapidly, to ensure continued operation of the combine 100. A sudden increase in the fan speed may cause a slight increase in the amount of grain lost, whereas a slow adjustment to the fan speed can be monitored to ensure that the grain loss does not increase. The system 200 is capable of continually tuning the adjustments made to the various components of the combine based on the information supplied to the computer 201 such that the operation of the combine 100 is optimized. Alternatively, the current statements, which are used to determine which adjustments to make to the combine, may be determined at various intervals In this embodiment, the system 200 would make adjustments in similar intervals rather than continually.

FIG. 3 illustrates a few of the components that are controlled by the control module 206, but it is understood that the control module 206 is capable of controlling any desired component or system on the combine. Typically, most adjustments are made to the velocity of the combine and the fan speed as these factors tend to have the most significant effect on the grain loss. In sum, the adjustments alter the operation of the combine components such that the current operating conditions match the optimum operation configuration generated by the computer.

The manual control module 204 functions to allow a combine operator to override the autonomous controls generated by the system 200 and executed through the control module 206. For instance, an operator may desire to increase the speed of the combine independent of the system 200. The manual control module 204 permits an operator to override the control module 206. Another important aspect of the manual control module 204 is that it can have different levels of control. For example, an owner or supervisor may be able to prevent certain operators from manually adjusting various operating conditions. For example, an owner may decide that the combine operators are not allowed to alter or exceed a prescribed velocity. However, it is advantageous for an operator to utilize the system 200 as more factors and data can be included in the operational decisions related to the combine and the combine components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an environment including machinery having components to produce an output, a system for controlling the machinery to optimize the output, the system comprising:
   a plurality of sensors, wherein at least some of the plurality of sensors are operably associated with one or more of the components such that a current characteristic of each component is measured;
   a computer configured to receive sensor data from the plurality of sensors including each current characteristic of each component measured by the at least some of the plurality of sensors, the computer including a database containing historical statements including historical characteristics of the one or more components, wherein the computer is configured to mine the database, produce a set of mined historical statements and analyze the sensor data including the current characteristics in light of the set of mined historical statements, and generate an optimum configuration for the machinery; and
   a control module, wherein the control module generates one or more control signals based on the optimum configuration to adjust the one or more components such the output of the machinery is optimized.

2. A system as defined in claim 1, wherein the plurality of sensors comprises an output loss sensor, the output loss sensor configured to detect fluorescence properties of the output.

3. A system as defined in claim 1, wherein the system further comprises a manual control module, wherein the manual control module overrides the one or more control signals.

4. A system as defined in claim 1, wherein the control signals adjust at least one of: a fan speed; a forward velocity of the machinery; a chaff opening; a rotor speed; and a concave.

5. A system as defined in claim 1, where the system further comprises a learning system.

6. A system as defined in claim 2, wherein the output loss sensor is a grain loss sensor configured to detect fluorescence properties of a plant residue.

7. In an agricultural environment including agricultural machinery for harvesting a grain, a system for optimizing the operation of the agricultural machinery in order to minimize a grain loss, the system comprising:
   a plurality of sensors operably configured to provide sensor data including data representative of characteristics of one or more components of the agricultural machinery;
   a database having a first portion storing historical statements including historical characteristics of the one or more components, and a second portion storing both current statements and mined data;
   a computer configured to receive the sensor data from the plurality of sensors and mine the historical statements stored in the first portion of the database to produce the mined data, wherein the sensor data and the mined data are analyzed to generate optimum operating conditions for the agricultural machinery; and
   a control module, the control module generating control signals to adjust the one or more components of the agricultural machinery based on the optimum operating conditions generated by the computer such that the grain loss is minimized.

8. A system as defined in claim 7, wherein the one or more components comprise one or more of: a mower, a header auger, a header rake, an elevator, a rotor, a concave, a grain pan, a chaffing sieve, a cleaning sieve, a beater, a grate, a fan; and an auger and elevator system.

9. A system as defined in claim 7, wherein the plurality of sensors comprise at least one of: a grain loss sensor; a forward velocity sensor; a fan speed sensor; a chaff opening sensor; a rotor speed sensor; a concave force sensor; a concave position sensor; a grain moisture sensor; a grain yield sensor; and a differential pressure sensor configured to sense a differential pressure across a cleaning sieve system.

10. A system as defined in claim 7, wherein the first portion and the second portion of the database comprise a computer-readable medium and wherein the first portion of the database is accessible by the computer.

11. A system as defined in claim 7, further comprising a learning system.

12. A system as defined in claim 7, further comprising a manual control module for overriding the control signals produced by the control module.

13. A system as defined in claim 7, wherein the control signals adjust at least one of: a fan speed; a forward velocity of the agricultural machinery; a chaff opening; a rotor speed; a concave force, and a concave position.

14. A system as defined in claim 9, wherein the grain loss sensor senses emission wavelengths of plant residue to quantify a grain loss data.

15. In a combine used for harvesting grain, a system for controlling the combine such that the grain harvested by the combine is optimized, the system comprising:
   a plurality of sensors operably associated with one or more components of the grain combine, the plurality of sensors generating sensor data including data representing measurements of the operation of the one or more components;
   a database storing historical data including historical characteristics of the one or more components and current data including sensor data, wherein the historical data and the current data are related to the grain;
   a computer configured to receive the sensor data, mine the historical data to produce a mined data set dependent upon the received sensor data, and analyze the current data and the mined data set to generate an adjustment for the components of the combine, wherein the adjustment changes the operation of the components such that grain harvested is optimized.

16. A system as defined in claim 15, wherein the components comprise one or more of: a mower, a header auger, a header rake, an elevator, a rotor, a concave, a grain pan, a chaffing sieve, a cleaning sieve, a beater, a grate, a chaff opening; a fan; and an auger and elevator system.

17. A system as defined in claim 15 wherein the plurality of sensors comprise at least one of: a grain loss sensor; a forward velocity sensor; a fan speed sensor; a chaff opening sensor; a rotor speed sensor; a concave force sensor; a concave position sensor; a grain moisture sensor; a grain yield sensor; and a differential pressure sensor configured to sense a differential pressure across a cleaning sieve system.

18. A system as defined in claim 15, wherein at least one of the plurality of sensors comprises a grain loss sensor including an excitation device that causes plant residue to emit emission wavelengths, wherein the emission wavelengths are analyzed to quantify a grain loss.

19. A system as defined in claim 15, further comprising a control module, the control module generating control signals based on the adjustment to alter the operation of at least one of the components.

20. A system as defined in claim 15, wherein the adjustment includes a change in at least one of: a forward velocity of the combine; a speed of a fan; a size of a chaff opening; a rotational speed of a rotor; and a position of a concave.

21. A system as defined in claim 15, further comprising a manual control module for overriding the adjustment generated by the computer.

22. A system as defined in claim 15, wherein an operator selects which of the plurality of sensors generate sensor data such that other sensors do not generate sensor data.

23. In a system including a grain combine for harvesting grain, a method for autonomously controlling components of the grain combine to maximize a grain yield, the method comprising:

sensing, through the use of a plurality of sensors, current operating characteristics of the components of the grain combine;

mining a database containing historical statements to produce mined data;

analyzing the mined data and the current operating characteristics of the components;

generating an optimum operating configuration for the components of the grain combine based on the analysis of the mined data and the current operating characteristics; and adjusting the operation of the components to match the optimum operating configuration such that the grain yield is optimized.

24. A method as defined in claim 23, wherein the plurality of sensors comprise at least one of: a grain loss sensor; a forward velocity sensor; a fan speed sensor; a chaff opening sensor; a rotor speed sensor; a concave force sensor; a concave position sensor; a grain moisture sensor; a grain yield sensor; and a differential pressure sensor configured to sense a differential pressure across a cleaning sieve system.

25. A method as defined in claim 23, wherein the mining a database further comprises performing a statistical analysis of the historical statements.

26. A method as defined in claim 23, wherein the generating an optimum operating configuration further comprises the step of identifying one or more components to be adjusted.

27. A method as defined in claim 23, further comprising the optional act of manually controlling at least one of the components of the combine.

28. A method as defined in claim 23, wherein the adjusting the operation of the components further includes adjusting one or more of: a combine forward velocity, a fan speed, a concave force, a concave position, a rotor speed, and a chaff opening.

29. A computer-readable medium having computer executable instructions for performing the steps recited in claim 23.

30. A method as defined in claim 26, wherein the adjusting the operation of the components further comprises the step of adjusting the identified one or more components.

* * * * *